(12) United States Patent  
Hall et al.

(10) Patent No.: US 7,526,918 B2
(45) Date of Patent: May 5, 2009

(54) HYDRAULIC ENERGY STORAGE WITH REINFORCED LAYER

(76) Inventors: David R. Hall, 2185 S. Larson Pkwy., Provo, UT (US) 84606; Francis Leany, 2185 S. Larson Pkwy., Provo, UT (US) 84606; Jacob Hannon, 2185 S. Larson Pkwy., Provo, UT (US) 84606; Tyson J. Wilde, 2185 S. Larson Pkwy., Provo, UT (US) 84606; Boyd Black, 2185 S. Larson Pkwy., Provo, UT (US) 84606

( * ) Notice: Subject to any disclaimer, the term of this patent is extended or adjusted under 35 U.S.C. 154(b) by 0 days.

(21) Appl. No.: 11/860,351

(22) Filed: Sep. 24, 2007

(65) Prior Publication Data

US 2009/0007554 A1    Jan. 8, 2009

Related U.S. Application Data

(63) Continuation of application No. 11/860,315, filed on Sep. 24, 2007, which is a continuation-in-part of application No. 11/837,383, filed on Aug. 10, 2007, which is a continuation-in-part of application No. 11/829,732, filed on Jul. 27, 2007, which is a continuation-in-part of application No. 11/773,561, filed on Jul. 5, 2007, which is a continuation-in-part of application No. 11/772,334, filed on Jul. 2, 2007.

(51) Int. Cl.
*F15B 15/00* (2006.01)
(52) U.S. Cl. ............................. 60/413; 92/92
(58) Field of Classification Search ............ 60/413; 92/90, 92
See application file for complete search history.

(56) References Cited

U.S. PATENT DOCUMENTS

| 3,661,327 | A | | 5/1972 | Adamson |
| 3,938,841 | A | | 2/1976 | Glance |
| 4,098,083 | A | | 7/1978 | Carman |
| 4,257,499 | A | | 3/1981 | Deschner |
| 4,479,356 | A | | 10/1984 | Gill |
| 4,616,392 | A | | 10/1986 | Snyder |
| 4,784,362 | A | | 11/1988 | Wang |
| 4,848,210 | A | | 7/1989 | Bissonnette |
| 5,067,390 | A | * | 11/1991 | Negishi ..................... 92/92 |
| 5,158,005 | A | * | 10/1992 | Negishi et al. ............ 92/92 |
| 5,201,262 | A | * | 4/1993 | Negishi et al. ............ 92/92 |
| 5,254,243 | A | | 10/1993 | Carr et al. |
| 5,263,401 | A | | 11/1993 | Walker |
| 5,277,683 | A | * | 1/1994 | Wilkins .................... 482/129 |
| 5,509,938 | A | | 4/1996 | Phillips |
| 5,511,759 | A | | 4/1996 | DeKraker |
| 5,579,640 | A | | 12/1996 | Gray |

(Continued)

*Primary Examiner*—Thomas E Lazo
(74) *Attorney, Agent, or Firm*—Tyson J. Wilde

(57) ABSTRACT

In one aspect of the present invention, a system for performing work has a hydraulic circuit adapted to store energy within a hose. The hose has an elastic inner layer pre-tensioned by a radial tensioning component disposed within the hose and at least one reinforcing layer of elastic thread disposed around and compressing the inner layer. A hydraulic fluid is in the circuit and in communication with the hose, the radial tensioning component and with a hydraulic actuator for doing the work. The circuit has a mechanism for pressurizing the hydraulic circuit in order to perform the work.

15 Claims, 10 Drawing Sheets

U.S. PATENT DOCUMENTS

| | | |
|---|---|---|
| 6,146,114 A | 11/2000 | Nardacci |
| 6,296,299 B1 | 10/2001 | Hanakawa |
| 6,468,315 B1 | 10/2002 | Wilkinson |
| 6,666,127 B2 * | 12/2003 | Peles .............................. 92/90 |
| 7,100,895 B2 | 9/2006 | Schurz |
| 7,104,052 B1 * | 9/2006 | Hindman ..................... 60/413 |
| 7,121,089 B2 * | 10/2006 | Tosen et al. ................... 60/413 |
| 2004/0173396 A1 | 9/2004 | Rush |

* cited by examiner

HYDRAULIC ENERGY STORAGE WITH REINFORCED LAYER

CROSS REFERENCE TO RELATED APPLICATIONS

This application is a continuation of U.S. patent application Ser. No. 11/860,315 which was filed on Sep. 24, 2007. U.S. patent application Ser. No. 11/860,315 is a continuation-in-part of U.S. patent application Ser. No. 11/837,383 filed on Aug. 10, 2007 which was a continuation-in-part of U.S. patent application Ser. No. 11/829,732 which was filed on Jul. 27, 2007 and entitled Expandable Vehicle Frame. U.S. patent application Ser. No. 11/829,732 is a continuation-in-part of U.S. patent application Ser. No. 11/773,561 which was filed on Jul. 5, 2007 and entitled Energy Storage in an Elastic Vessel. U.S. patent application Ser. No. 11/773,561 is a continuation-in-part of U.S. patent application Ser. No. 11/772,334 which was filed on Jul. 2, 2007 and entitled Energy Storage. This application is inhere incorporated by reference for all that is discloses.

BACKGROUND OF THE INVENTION

The current invention relates to hydraulic systems for performing work. Hydraulic systems are used in many different applications such as automobiles, trucks, construction equipment, elevators, submarines, and many others. Hydraulic systems may be used to improve such areas as fuel efficiency and power output of mechanical systems which require energy to perform various forms of work, such as lifting payloads, propelling vehicles, or raising elevators. In some applications, it may be desirous to have energy storage in the hydraulic system to provide extra energy when needed.

In hydraulic circuits, hydraulic accumulators have been used to store excess hydraulic fluid. These hydraulic accumulators may comprise an elastic bladder within a rigid chamber. A compressible medium such as a gas may be disposed within the chamber outside of the elastic bladder, while the hydraulic fluid may be disposed within the elastic bladder. When the volume of hydraulic fluid in the bladder increases, the bladder compresses against the compressible medium thereby generating a potential energy within the rigid chamber which is stored outside of the elastic bladder.

U.S. Pat. No. 6,807,988 to Powell et al., which is herein incorporated by reference for all that it contains discloses a flexible hose adapted construction for conveying fluids under pressure. The construction includes a core tube having a circumferential inner core tube surface. A first reinforcement layer surrounds the outer core tube surface, and is formed of one or more filaments of a first fiber. A second fiber reinforcement layer surrounds the first reinforcement layer, and is formed of one or more filaments of a second fiber. The first and second reinforcement layers are bonded together by means of a bonding agent such as an adhesive, resin, plasticizer, tackifier, or solvent, the application of which is controlled to wet on a portion of the filaments of the reinforcement layers.

U.S. Pat. No. 5,042,532 to Gilleland, which is herein incorporated by reference for all that it contains discloses a pipeline repair and leak sealing system effected by unrolling a tube, using an inflatable mandrel disposed inside the tube, to radially expand a stretchable and circumferentially continuous gasket or sealant sleeve into flush contact with the pipeline interior. Before actuation, the tube is constrained in a rolled-up condition by a shrink-wrap sleeve of plastic film that may be sealed at its ends to an interior film sleeve in order to protect the tube against moisture. When fully expanded, the tube includes longitudinally-extending edges that overlap and are secured together by adhesive issued from a rupturable package disposed proximate one of the edges so as to be caused to burst as the edges approach overlapped positions. An outer sleeve of scrim material surrounds the tacky or gum-like gasket sleeve to facilitate handling and movement of the assembly in the pipeline. When the tube and gasket sleeve are expanded, the scrim material becomes embedded in the tacky gasket sleeve material which thereby protrudes through the scrim interstices to assure proper sealing and compression of the gasket sleeve against the pipeline interior wall.

U.S. Pat. No. 4,733,603 to Kukolj, which is herein incorporated by reference for all that it contains discloses an actuator that has a first connection point and a second connection point at opposite ends and is contractible along an axis extending between the connections points. The actuator has at least one hollow enclosure with an opening for admitting a pressurized fluid. A simultaneously radially expandable, axially contractible constraining means cooperates with the enclosure. The constraining means converts radial expansion of the actuator into axial contraction when pressurized fluid is admitted into the enclosure. In a preferred form, the constraining means comprises a network of non-stretchable, flexible tension links.

BRIEF SUMMARY OF THE INVENTION

In one aspect of the present invention, a system for performing work has a hydraulic circuit adapted to store energy within a hose. The hose has an elastic inner layer pre-tensioned by a radial tensioning component disposed within the hose and at least one reinforcing layer of elastic thread disposed around and compressing the inner layer. A hydraulic fluid is in the circuit and in communication with the hose, the radial tensioning component and a hydraulic actuator for doing the work. The circuit has a mechanism for pressurizing the hydraulic circuit in order to perform the work.

In some embodiments, the at least one reinforcing layer of elastic thread may comprise a total thickness of the thread. The at least one reinforcing layer of elastic thread may comprise a total thickness of ten times the thickness of the thread. The elastic thread may be braided, interwoven, wrapped and/or combinations thereof. The elastic thread may have a modulus of elasticity of rubber. The at least one reinforcing layer may comprise a material selected from the group consisting of composite material, polyurethane, polyethylene, rubber, synthetic polymers, chloroprene, elastomers, silicone rubber, rubber foam, or a combination thereof.

The inner layer may comprise a material selected from the group consisting of composite material, Kevlar, polyurethane, polyethylene, Twaron, aramid fiber, nylon, rubber, carbon, synthetic polymers, chloroprene, elastomers, polyester, silicone rubber, rubber foam, carbon fiber, glass fiber, cloth or a combination thereof.

The radial tensioning component may be segmented. The radial tensioning component may comprise a perforated pipe. The radial tensioning component may comprise a spring, a frame, or combinations thereof.

The hose and radial tensioning component may be enclosed within a low pressure reservoir of the hydraulic circuit. The hose may have an outer diameter of 0.9 to 1.75 inches.

The hydraulic circuit may be adapted to store at least 50 foot pounds of energy within the hose. A material of the hose may store at least 85% of the energy. The hydraulic fluid may be compressible and at least 10% of the energy may be stored in the hydraulic fluid. A compressible element may be disposed within the hose and at least 15% of the energy may be stored in the compressible element.

The hose may be inflated with hydraulic fluid to over 1,000 psi. The hose may be inflated with hydraulic fluid to over 6,000 psi.

The system may be incorporated in an automobile, golf cart, a truck, an elevator, backhoe, bulldozer, trencher, milling machine, a boat, construction equipment, or a combination thereof.

In one aspect of the present invention, a hose for storing energy may comprise an elastic inner layer pre-tensioned by a radial tensioning component disposed within the hose and at least one reinforcing layer of elastic thread disposed around and compressing the inner layer. A hydraulic fluid may be in communication with the hose and with the radial tensioning component.

DETAILED DESCRIPTION OF THE INVENTION AND THE PREFERRED EMBODIMENT

Figure 1:
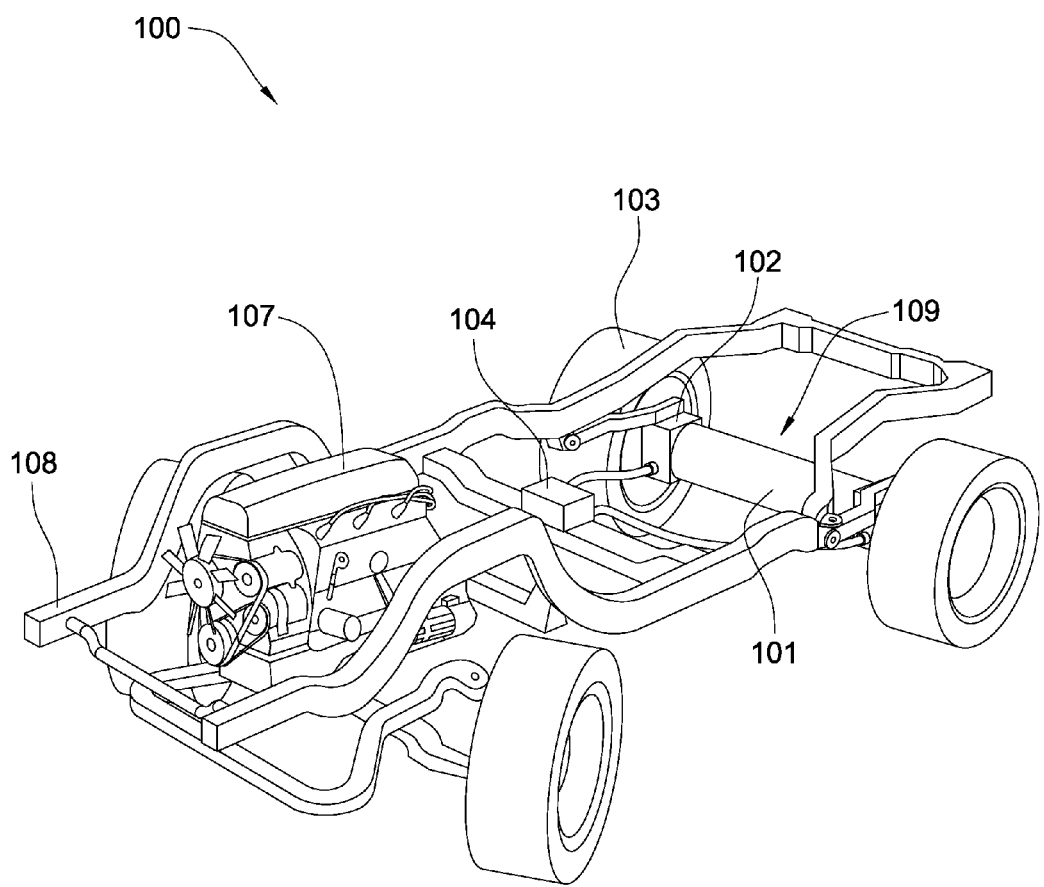
FIG. 1 is a perspective diagram of an embodiment of an automobile.

The current invention may be incorporated into a vehicle 100 such as an automobile, as in the embodiment of FIG. 1. The vehicle may comprise a frame 108, an engine 107, translation assemblies 103, a hydraulic pump 104, a plurality of manifolds 102, and a hose assembly 101. The hose assembly 101 may be in communication with the plurality of manifolds 102. The manifolds 102 may be disposed proximate the translation assemblies. The translation assemblies 103 may be in mechanical communication with individual hydraulic actuators disposed within the manifolds 102. When the vehicle 100 brakes, energy may be captured and stored in the hose assembly 101. The hydraulic pump 104 may be in communication 110 with the engine 107 and the hose assembly 101. The hydraulic pump 104 may transfer energy from the engine 107 to the hose assembly 101. The hose assembly 101 may be incorporated into at least one of the axles 109 of the vehicle 101.

Figure 2:
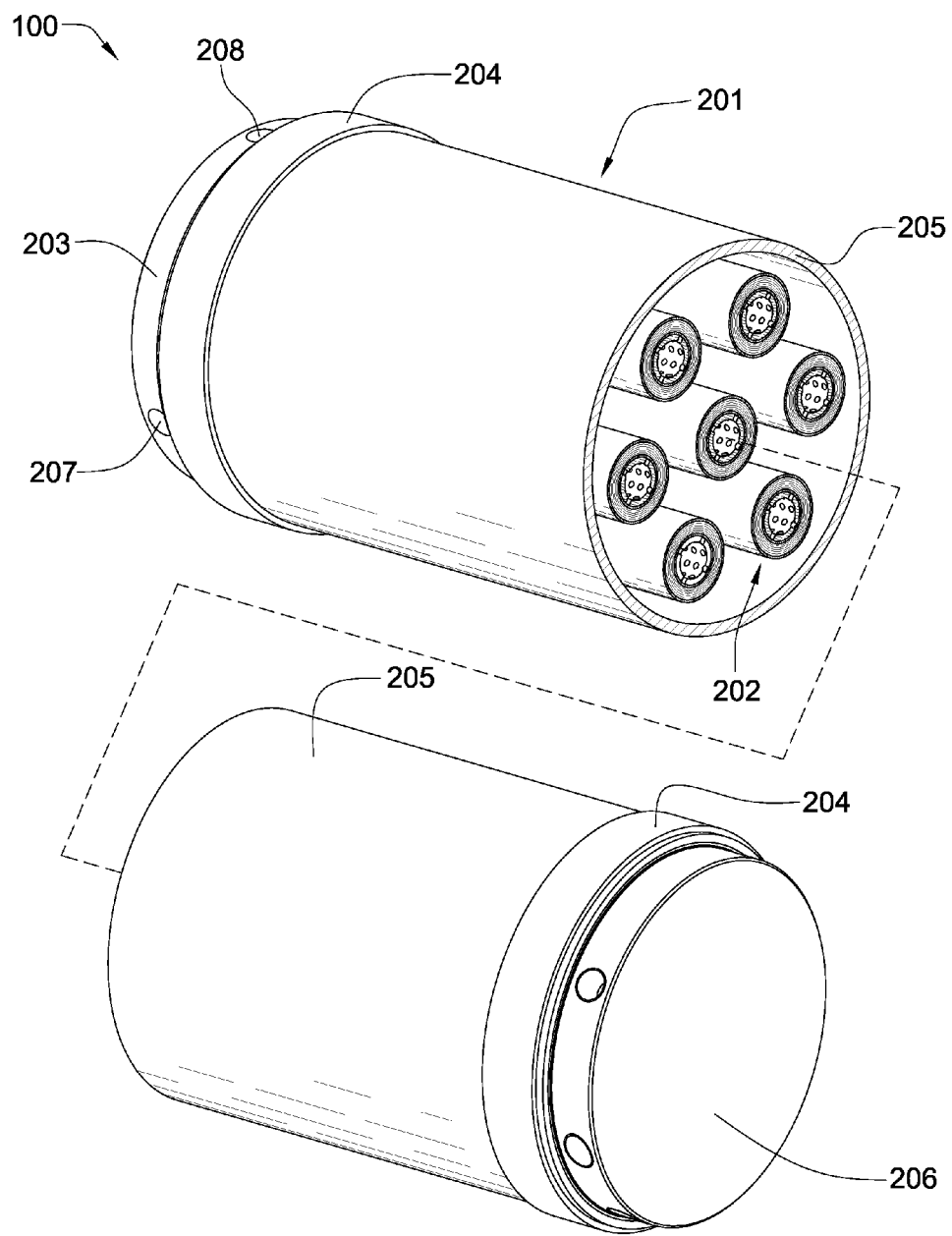
FIG. 2 is a cross-sectional diagram of an embodiment of a system for performing work.

Referring now to FIG. 2, the hose assembly 101 may comprise at least one high pressure reservoir 202 disposed within a low pressure reservoir 201. The low pressure reservoir 201 may comprise an elastic tube 205 disposed intermediate a front mandrel 203 and a rear mandrel 206. A clamping mechanism 204 may be utilized to connect the elastic tube 205 to the front mandrel 203 and to the rear mandrel 206. The front mandrel 203 may comprise a low pressure port 207 adapted to allow hydraulic fluid 313 to enter and exit the low pressure reservoir 201. The front mandrel 203 may comprise a high pressure port 208 adapted to allow hydraulic fluid 313 to enter and exit the high pressure reservoir 202. When the hydraulic fluid 313 is expelled from the high pressure reservoir 202 and enters the low pressure reservoir 201 the elastic tube 205 may expand radially to accommodate the hydraulic fluid 313. The tube 205 may store the hydraulic fluid 313 at a pressure of 190 psi to 300 psi. The tube 205 may comprise a material selected from the group consisting of composite material, Kevlar, polyurethane, polyethylene, Twaron, aramid fiber, nylon, rubber, carbon, synthetic polymers, chloroprene, elastomers, polyester, silicone rubber, rubber foam, carbon fiber, glass fiber, cloth or a combination thereof. The tube 205 may have a modulus of elasticity of rubber.

The tube 205 may have a diameter of 8 inches to 15 inches. The diameter of the tube 205 may be approximately ten times larger than a diameter of the high pressure reservoir 202. The tube 205 may be rigid.

Figure 3:
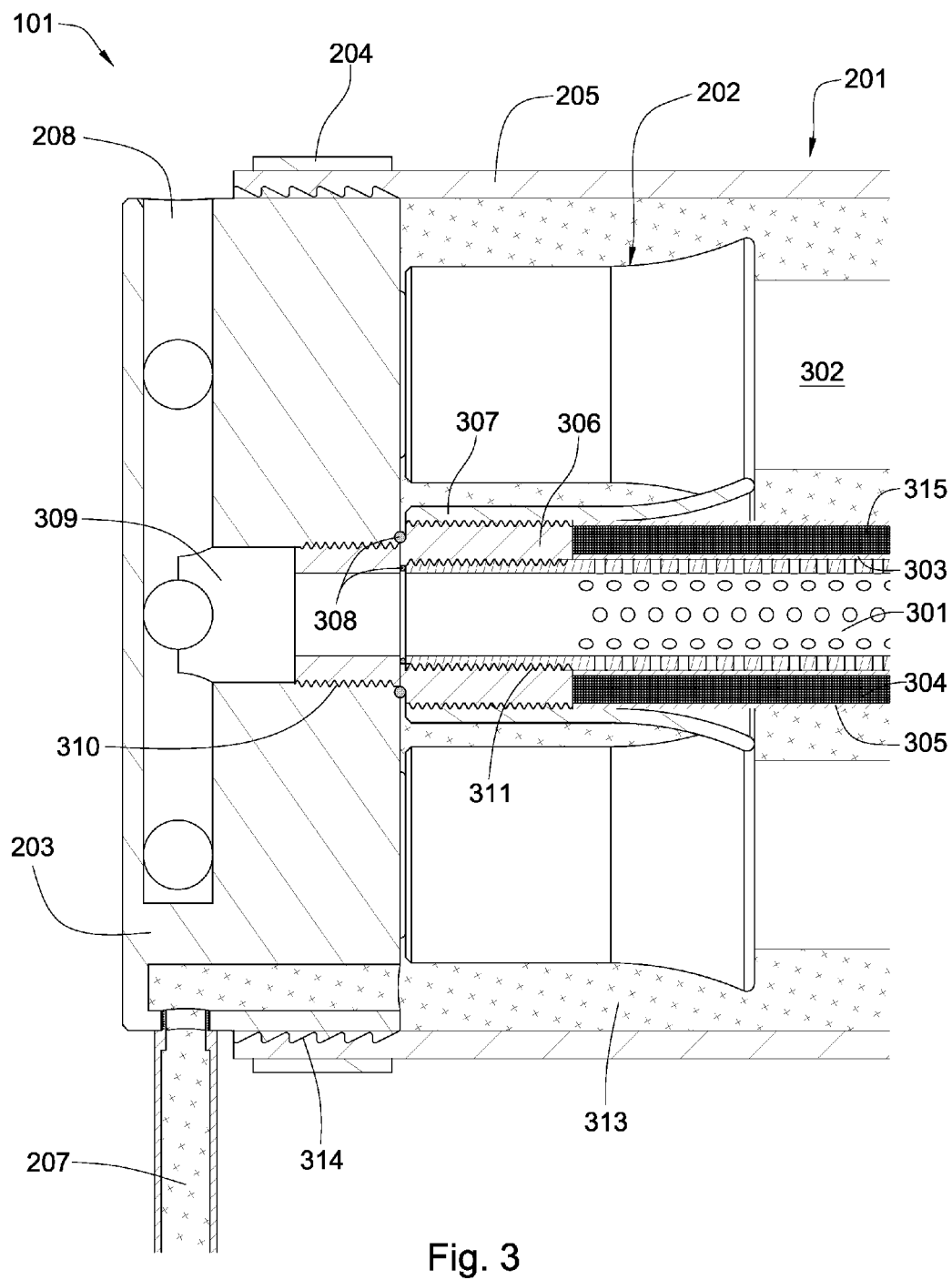
FIG. 3 is a cross-sectional diagram of another embodiment of a system for performing work.

Referring now to FIG. 3, the front mandrel 203 may comprise a corrugated surface 314 to enhance the connection between the front mandrel 203 with the elastic tube 205. The rear mandrel 206 may comprise a corrugated surface 314 to enhance the connection between the rear mandrel 206 with the elastic tube 205.

The high pressure reservoir 202 may be adapted to store at least 50 foot pounds of energy. The at least one high pressure reservoir 202 may comprise a radial tensioning component 301 disposed within a hose 302. The radial tensioning component 301 may comprise a rigid perforated pipe 301. A material of the hose 302 may store at least 85% of the energy. At least 10% of the energy may be stored in the compressible hydraulic fluid 313. The hose 302 may have an outer diameter of 0.9 to 1.75 inches before pressurization. The hose 302 may be inflated with hydraulic fluid to over 1,000 psi. The hose 302 may be inflated with hydraulic fluid to over 6,000 psi.

The hose 302 may comprise an elastic inner layer 303 pre-tensioned by the radial tensioning component 301. The inner layer 303 may comprise a material selected from the group consisting of composite material, Kevlar, polyurethane, polyethylene, Twaron, aramid fiber, nylon, rubber, carbon, synthetic polymers, chloroprene, elastomers, polyester, silicone rubber, rubber foam, carbon fiber, glass fiber, cloth or a combination thereof.

At least one reinforcing layer of elastic thread 304 may be disposed around and compressing the inner layer 303. The at least one reinforcing layer of elastic thread 304 may comprise a total thickness of the thread. Preferably the at least one reinforcing layer of elastic thread 304 may comprise a total thickness of ten times the thickness of the thread. The elastic thread may have a modulus of elasticity of rubber. The at least one reinforcing layer 304 may comprise a material selected from the group consisting of composite material, polyurethane, polyethylene, rubber, synthetic polymers, chloroprene, elastomers, silicone rubber, rubber foam, or a combination thereof. The at least one reinforcing layer 304 may be covered by an elastic layer 305 that may provide protection to the reinforcing layer 304.

Both the ends of the hose 302 and the ends of the radial tensioning component 301 may be connected via couplings 306 to the front mandrel 203 and the rear mandrel 206 disposing the hose 302 and the radial tensioning component 301 intermediate the front mandrel 203 and the rear mandrel 206. The radial tensioning component 301 may be connected to the couplings 306 by a right-handed threaded connection 311 or by a left-handed threaded connection 311. The couplings 306 may be connected to the front mandrel 203 or the rear mandrel 206 by a right-handed threaded connection 310 or by a left-handed threaded connection 310.

O-rings 308 may be disposed intermediate the radial tensioning component 301 and the couplings 306. An o-ring 308 may be disposed intermediate the coupling 306 and the front mandrel 203 to help prevent hydraulic fluid 313 from leaking out of the high pressure reservoir 202 to the low pressure reservoir 201. An o-ring 308 may be disposed intermediate the coupling 306 and the rear mandrel 206 to help prevent hydraulic fluid 313 from leaking out of the high pressure reservoir 202 to the low pressure reservoir 201.

Fittings 307 may be disposed around the connection between the couplings 306 and the hose 302. The fittings 307 may apply pressure on the ends of the hose 302 causing the ends of the hose 302 to be pinched between the fittings 307 and the radial tensioning component 301. The fittings 307 may expand in diameter as the fittings 307 extend away from the couplings 306. It is believed that the expansion in diameter in the fittings 307 will accommodate the hose 302 as the hose 302 expands in diameter when hydraulic fluid 313 is pumped into the high pressure reservoir 202 from the low pressure reservoir 201.

Figure 4:
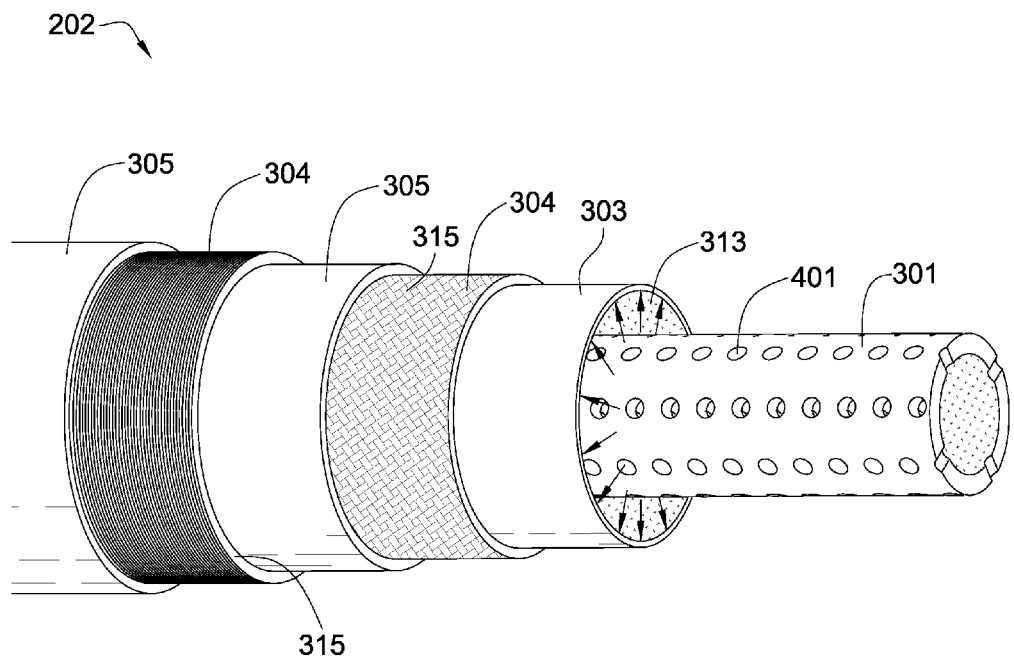
FIG. 4 is a perspective cross-sectional diagram of an embodiment of a hose.
Figure 5:
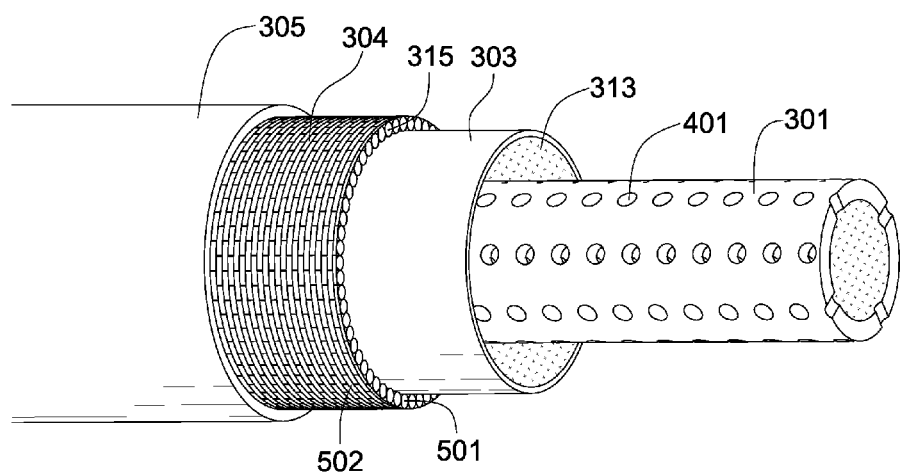
FIG. 5 is a perspective cross-sectional diagram of another embodiment of a hose.

Referring to FIGS. 4 through 5, the reinforcing layer 304 may comprise elastic thread that is interwoven, wrapped, braided and/or combinations thereof. It is believed that braiding or interweaving the elastic thread may give the reinforcing layer 304 added strength and may prevent the inner elastic layer 303 from bulging through the reinforcing layer 304 as the hose 302 expands in diameter with the inflow of hydraulic fluid 313 into the high pressure reservoir 202. The hose 302 may comprise multiple reinforcing layers 304 such as the embodiment disclosed in FIG. 4.

Figure 6:
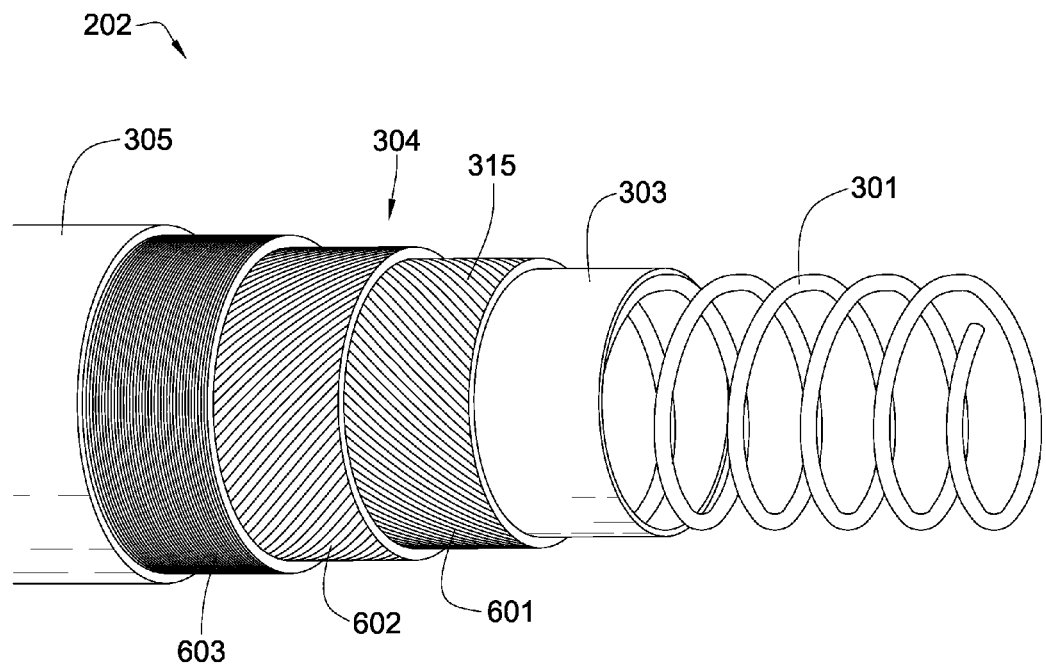
FIG. 6 is a perspective cross-sectional diagram of another embodiment of a hose.

FIG. 6 discloses another embodiment of the present invention wherein the reinforcing layer 304 may comprise layers of thread that differ one from the other in wrapping style. At least two of the differing layers may be wrapped in directions that oppose one 601 another 602. The thread may be wrapped at an angle.

Figure 7:
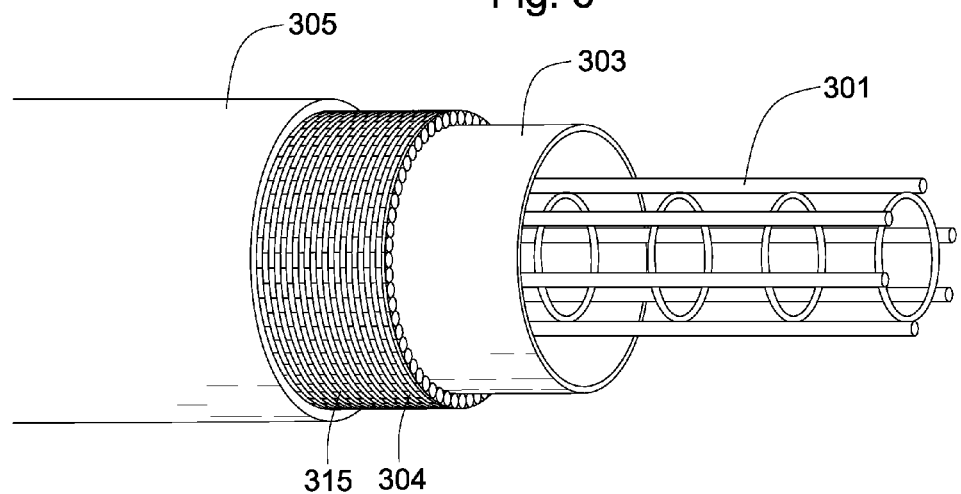
FIG. 7 is a perspective cross-sectional diagram of another embodiment of a hose.

The radial tensioning component 301 may comprise a spring 301. FIG. 7 discloses another embodiment of the present invention wherein the radial tensioning component 301 may comprise a frame 301.

Figure 8:
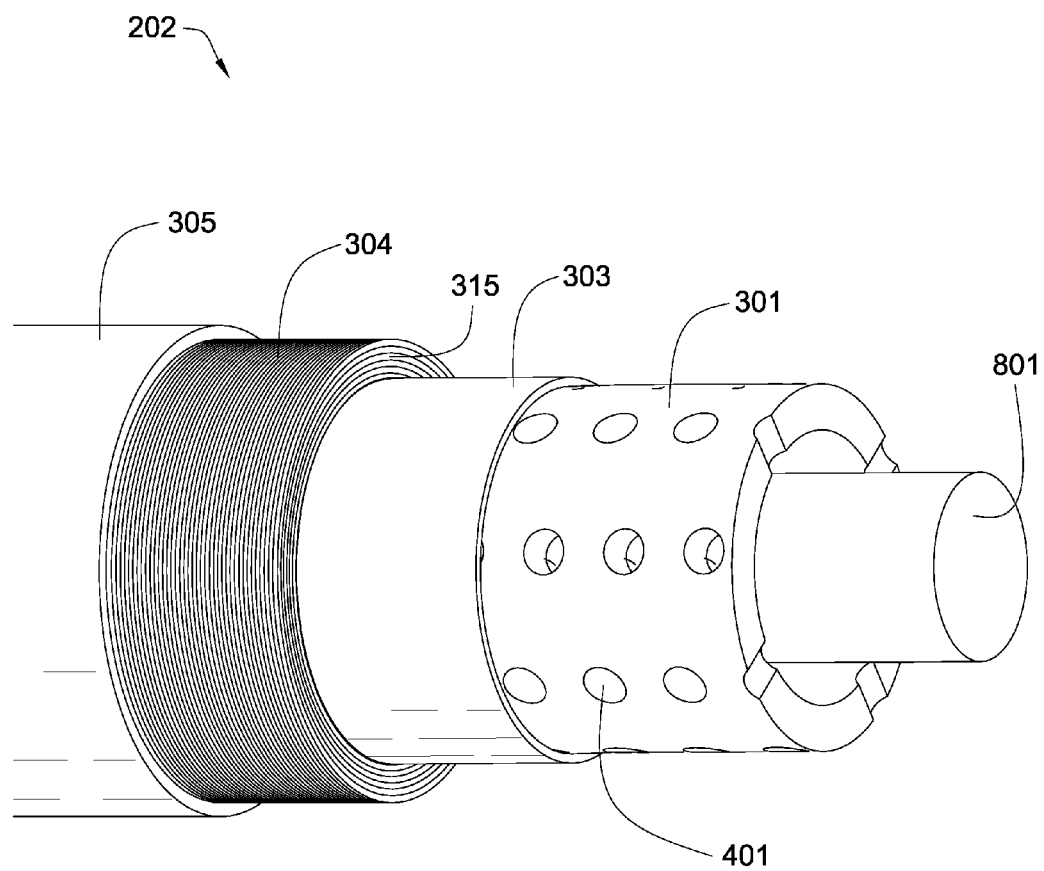
FIG. 8 is a perspective cross-sectional diagram of another embodiment of a hose.

Referring now to FIG. 8, a compressible element 801 may be disposed within the hose. It is believed that the compressible element 801 may assist the hose 302 in storing energy when the high pressure reservoir 202 is pressurized. At least 15% of the energy may be stored in the compressible element 801.

Figure 9:
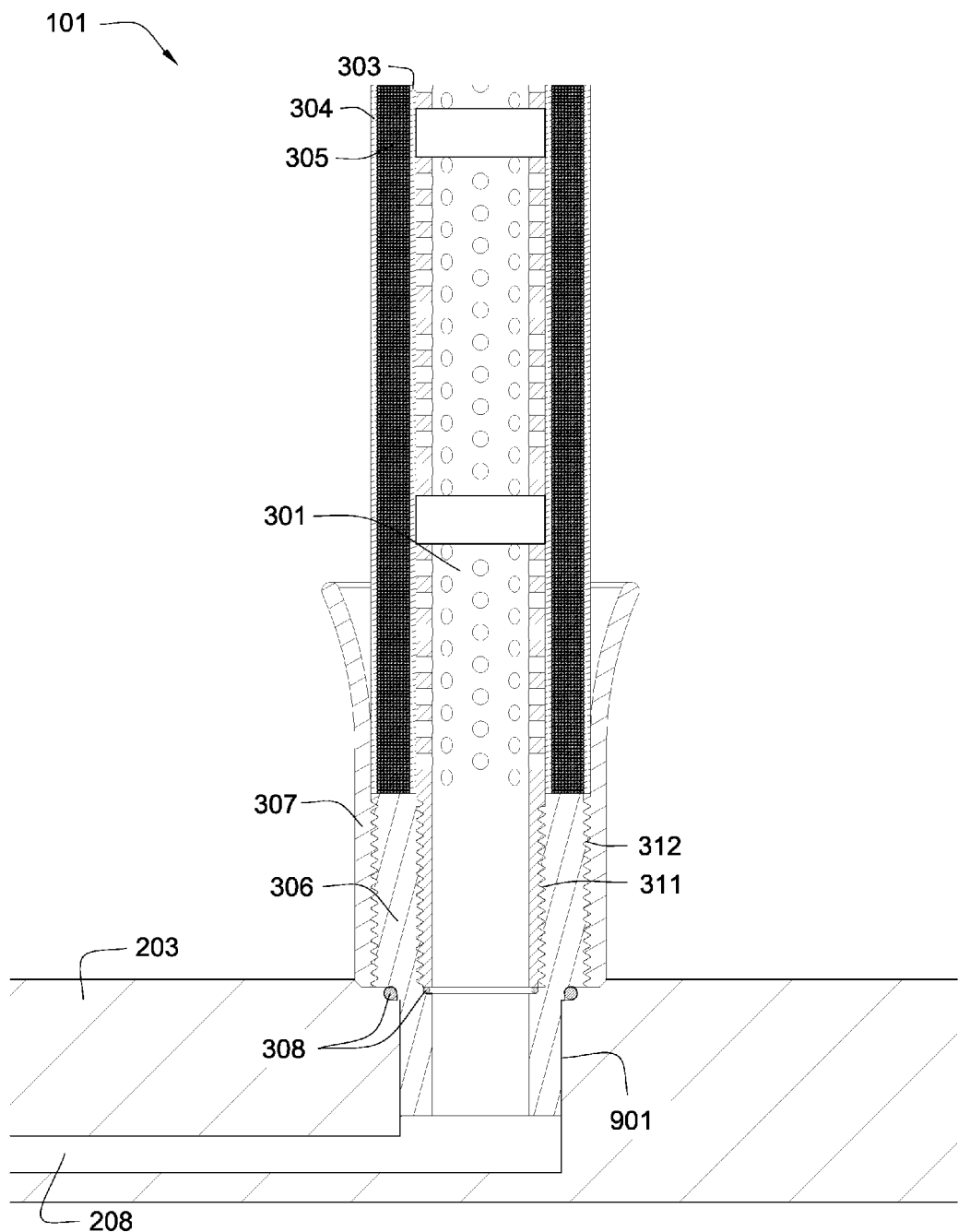
FIG. 9 is a cross-sectional diagram of another embodiment of a system for performing work.

Referring now to FIG. 9, the radial tensioning component 301 may be segmented. It is believed that the segmented radial tensioning component 301 may facilitate the assembly process of the hose assembly 101.

Figure 10:
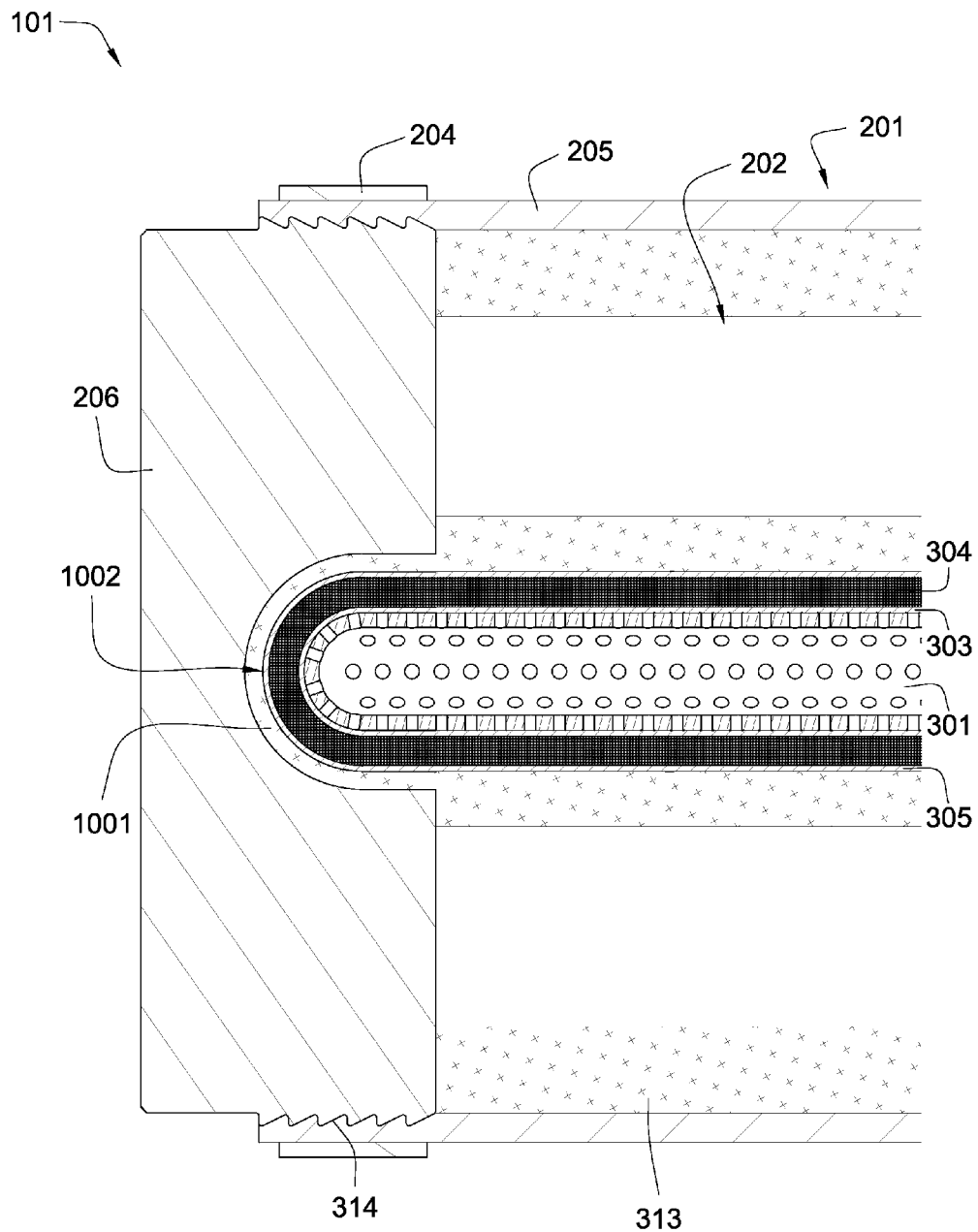
FIG. 10 is a cross-sectional diagram of another embodiment of a system for performing work.

The high pressure reservoir 202 may comprise a rounded end 1002 such as in the embodiment disclosed in FIG. 10. The rear mandrel 206 may have a recess 1001 adapted to receive the rounded end 1002 of the high pressure reservoir 202. The recess 1001 may be large enough to permit the hose 302 portion of the round end 1002 to expand within the recess when the high pressure reservoir 202 is pressurized.

Figure 11:
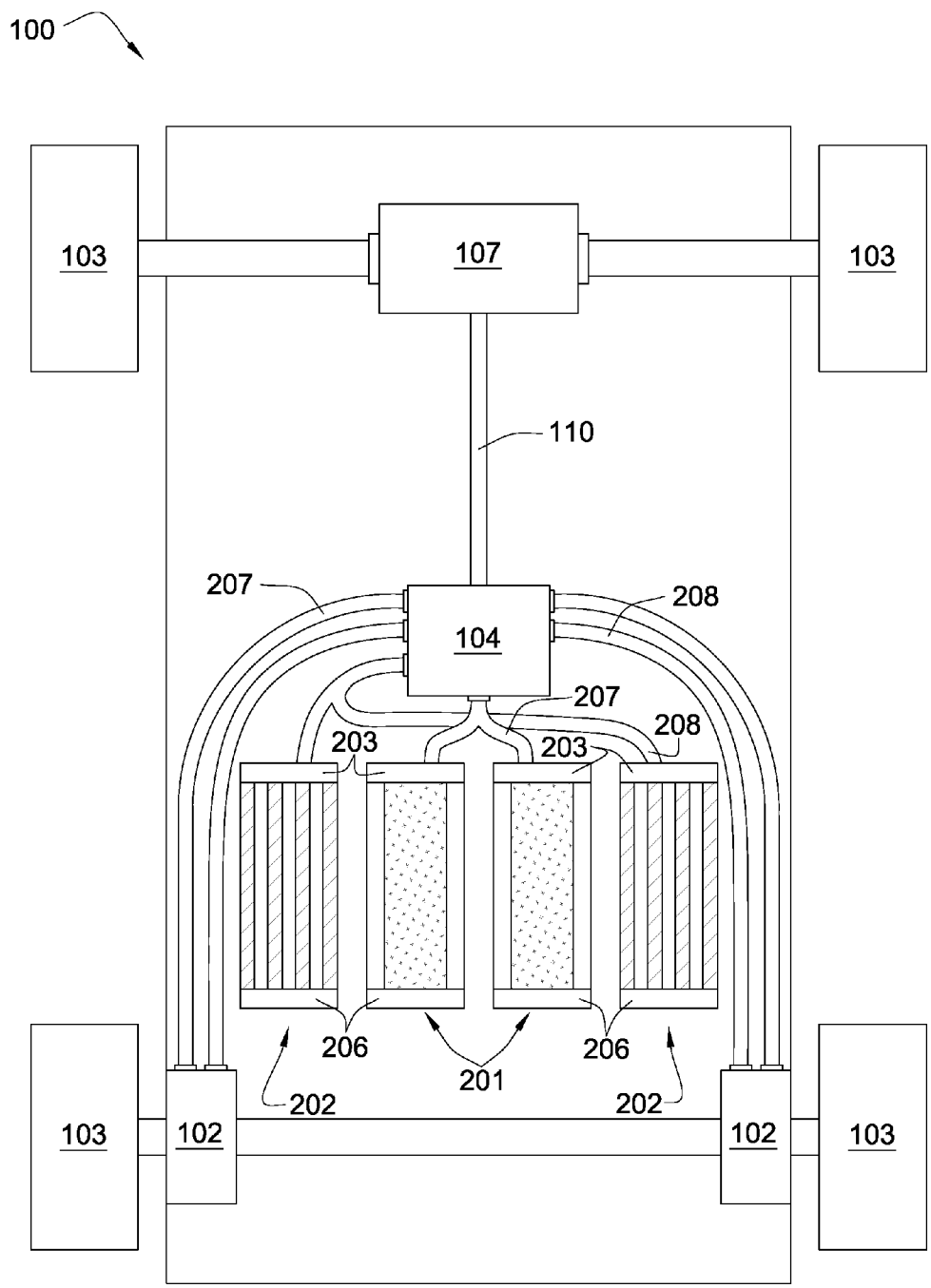
FIG. 11 is a cross-sectional diagram of another embodiment of an automobile.
Figure 12:
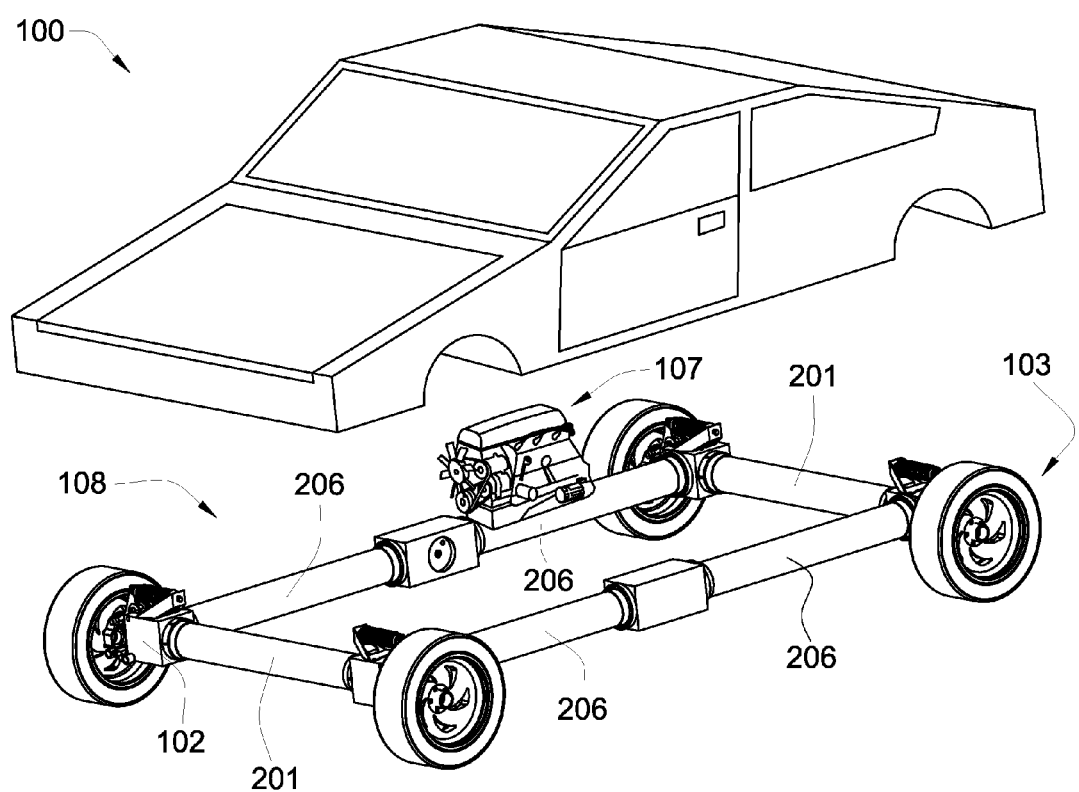
FIG. 12 is a perspective diagram of another embodiment of an automobile.

Referring now to FIG. 11, the high pressure reservoir 202 may be disposed outside the low pressure system 201. The high pressure reservoir 202 and the low pressure reservoir 201 may be incorporated into the frame 108 of the vehicle 100 such as the embodiment disclosed in FIG. 12.

Whereas the present invention has been described in particular relation to the drawings attached hereto, it should be understood that other and further modifications apart from those shown or suggested herein, may be made within the scope and spirit of the present invention.

What is claimed is:

1. A system for performing work, comprising:
   a hydraulic circuit adapted to store energy within a high pressure hose;
   a low pressure reservoir disposed around the hose;
   a hydraulic fluid in the circuit in communication with the high pressure hose, the low pressure reservoir and with a hydraulic actuator for doing the work; and
   a mechanism for pressurizing the hydraulic circuit in order to perform the work;
   wherein the hydraulic circuit is adapted to store at least 50 foot pounds of energy within the hose, a material of the hose stores at least 85% of the energy, and the hose is inflated with hydraulic fluid to over 1,000 psi.

2. The system of claim 1, wherein the low pressure reservoir is elastic.

3. The system of claim 1, wherein the low pressure reservoir comprises a material selected from the group consisting of composite material, Kevlar, polyurethane, polyethylene, Twaron, aramid fiber, nylon, rubber, carbon, synthetic polymers, chloroprene, elastomers, polyester, silicone rubber, rubber foam, carbon fiber, glass fiber, cloth or a combination thereof.

4. The system of claim 1, wherein the low pressure reservoir has a modulus of elasticity of rubber.

5. The system of claim 1, wherein the low pressure reservoir has a diameter of 8 inches to 15 inches.

6. The system of claim 5, wherein the diameter of the low pressure reservoir is approximately ten times larger than a diameter of the hose.

7. The system of claim 1, wherein the low pressure reservoir stores fluid at a pressure of 190 psi to 300 psi.

8. The system of claim 1, wherein the low pressure reservoir is rigid.

9. The system of claim 1, wherein the hose is inflated with hydraulic fluid to over 6,000 psi.

10. The system of claim 1, wherein the diameter of the hose is 0.9 to 1.75 inches.

11. The system of claim 1, wherein the high pressure hose is pre-tensioned by a radial tensioning component disposed within the hose.

12. The system of claim 11, wherein the radial tensioning component is segmented.

13. The system of claim 11, wherein the radial tensioning component is a perorated pipe.

14. The system of claim 11, wherein the radial tensioning component is a spring or a frame.

15. A hose for storing energy, comprising:
    a hydraulic circuit adapted to store energy within a hose;
    the hose is pre-tensioned by a radial tensioning component disposed within the hose;
    a low pressure reservoir disposed around the hose;
    a hydraulic fluid in the circuit in communication with the hose, the radial tensioning component, and the low pressure reservoir;
    wherein the hydraulic circuit is adapted to store at least 50 foot pounds of energy within the hose, a material of the hose stores at least 85% of the energy, and the hose is inflated with hydraulic fluid to over 1,000 psi.

* * * * *